United States Patent [19]

Snavely, Jr. et al.

[11] Patent Number: 4,787,455
[45] Date of Patent: Nov. 29, 1988

[54] METHOD FOR SCALE AND CORROSION INHIBITION IN A WELL PENETRATING A SUBTERRANEAN FORMATION

[75] Inventors: Earl S. Snavely, Jr., Arlington, Tex.; John Hen, Skillman, N.J.

[73] Assignee: Mobil Oil Corporation, New York, N.Y.

[21] Appl. No.: 122,170

[22] Filed: Nov. 18, 1987

[51] Int. Cl.[4] .................... E21B 41/02; E21B 43/12
[52] U.S. Cl. .................................. 166/279; 166/300; 166/902; 252/8.552; 252/8.555
[58] Field of Search .............. 166/279, 300, 310, 371, 166/902; 252/8.552, 8.555

[56] References Cited

U.S. PATENT DOCUMENTS

| | | | |
|---|---|---|---|
| 2,437,475 | 3/1948 | Oxford, Jr. ...................... | 252/8.555 |
| 3,481,400 | 12/1969 | Kerver et al. ...................... | 166/279 |
| 3,547,817 | 12/1970 | Hansen, Jr. et al. ......... | 252/8.552 X |
| 3,633,672 | 1/1972 | Smith et al. ...................... | 166/279 |
| 4,231,869 | 11/1980 | Carlberg et al. ................ | 166/902 X |
| 4,393,938 | 7/1983 | Lawson et al. ..................... | 166/279 |
| 4,495,996 | 1/1985 | Meyers et al. ...................... | 166/279 |
| 4,602,683 | 7/1986 | Meyers ................................ | 166/279 |

Primary Examiner—George A. Suchfield
Attorney, Agent, or Firm—Alexander J. McKillop; Michael G. Gilman; Lawrence O. Miller

[57] ABSTRACT

A method for inhibiting the formation of scale and corrosion in a well penetrating a subterranean formation for the production of fluids from the formation comprising injecting a predetermined amount of microparticles of a basic anion exchange resin providing a source of polycations into the formation about the well and that are trapped and retained by the interstices of the formation without rendering the interstices or the formation impermeable to the flow of fluids. Thereafter a predetermined amount of an aqueous solution of scale and corrosion inhibitor is injected into the formation about the well that contacts the basic anion exchange resin and becomes fixed in a slightly soluble state either by complexation with the polycations or is precipitated by the polycations in the exchange resin. The scale and corrosion inhibitor is released slowly at effective concentration into fluids produced by the well to inhibit scale formation and corrosion.

7 Claims, No Drawings

METHOD FOR SCALE AND CORROSION INHIBITION IN A WELL PENETRATING A SUBTERRANEAN FORMATION

FIELD OF THE INVENTION

This invention relates to inhibiting scale formation and corrosion in a well penetrating a subterranean formation.

BACKGROUND OF THE INVENTION

In the production of water, oil and gas from subterranean formations, scale deposits can frequently result in: plugged well bores, plugged well casing perforations, plugged tubing strings, stuck downhole safety valves as well as other valves, stucked downhole pumps and other downhole and surface equipment and lines, scaled formations and fractures in the vicinity of the well. Such scale formation can occur as a result of mixing of incompatible waters in the well, i.e., waters which when mixed produce precipitates, or as a result of temperature and pressure changes and the like in the produced waters during production. Generally, incompatible waters are formed as a consequence of waterflooding, as injected sea water mixes with formation water in the borehole during water breakthrough. The more common concern are scales deposited because of changes in supersaturation or solubility of minerals in the formation or produced waters caused by pressure and temperature changes, or changes in other physical and chemical environments such as gas compositions, ratio of gas/oil/water. Precipitates which are frequently encountered as scale include calcium carbonate, calcium sulfate, barium sulfate, magnesium carbonate, magnesium sulfate, and strontium sulfate. The deposition of scale is a very complex crystalline process initiated by a supersaturation-induced nucleation of a precipitate of the mineral, scale ions contact these nuclei and the crystal grows in certain crystalline pattern. The adherence of these mineral crystals unto the formation matrix, perforation, well-bore, tubings and equipment is a not well-understood process but once initiated, appears to be spontaneous as seen by the increasing thickness of the scale deposit and the steady decline in productivity. In some cases, production can be halted when valves and pumps are stuck—creating a potentially dangerous situation.

The squeezing of chemicals for protecting wells, particularly oils wells, is widely practiced. A "squeeze" job might last one to six months depending on the nature of the subterranean formation into which the chemical is squeezed and the rate at which fluids e.g., oil and water, are produced by the well. A formation that has low permeability but high porosity, and from which low rates of oil and water are produced would likely bleed injected chemicals back for a long time. However, a problem arises with highly permeable formations which produce high rates of oil and water. This type of formation retains chemicals for only a short time because they are readily washed out of the permeable zones of the formation by the high volumes of produced fluids.

In an article by Carlberg and Essel entitled, "Strontium Sulfate Scale Control by Inhibitor Squeeze Treatment in the Fateh Field", published in the *Journal of Petroleum Technology*, in June 1982, there is disclosed a method for inhibiting scale formation in a subterranean limestone formation by injecting an acid form of a polyphosphonate which forms a slightly soluble calcium salt. Calcium ions released on dissolution of some of the limestone (calcium carbonate) rock by the acid precipitates calcium polyphosphonate allowing greater retention in the rock. However, this method does not work in sandstones, because sandstones are not soluble in acids, nor do they form calcium ions even when dissolved.

U.S. Pat. No. 3,827,977, discloses the use of water-insoluble metal salts of relatively low molecular weight polyacrylic acids and/or relatively low molecular weight hydrolyzed polyacrylamides as scale inhibitors placed at or near the bottom of a well or formed in situ in the formation that are slowly released into fluids produced by the well.

U.S. Pat. No. 4,602,683 discloses a scale inhibitor precipitation squeeze method wherein an aqueous scale inhibitor solution containing amine phosphonates including salts thereof, having solubility that significantly decreases with decreasing pH, is injected into a formation near a well and thereafter the pH of the solution is lowered to precipitate the scale inhibitor in the formation.

In Applicant's co-pending application Ser. No. 122,301, filed Nov. 18, 1987, there is disclosed a method for inhibiting scale formation and corrosion in a well penetrating a subterranean formation by trapping microparticles of a cation exchange resin (loaded with the desired multivalent cation) and fixed with a scale and corrosion inhibitor into the interstices of the formation in the vicinity of and surrounding the well without rendering the interstices impermeable to the flow of fluids whereby the scale and corrosion inhibitor subsequently bleeds back into fluids produced by the well from the formation, thereby inhibiting scale formation in the well and corrosion in the production system.

The present invention provides a method for inhibiting scale formation and corrosion in a well penetrating a subterranean formation by trapping microparticles of a basic anion exchange resin fixed with a scale and corrosion inhibitor in the interstices of the formation in the vicinity of and surrounding the well without damaging the formation or hindering the flow of fluid. The scale and corrosion inhibitor subsequently bleeds back into fluids produced by the well from the formation, thereby inhibiting scale formation and corrosion.

SUMMARY OF THE INVENTION

This invention is directed to a method for inhibiting the formation of scale and corrosion in a well penetrating a subterranean formation for the production of fluids from the formation comprising injecting a predetermined amount of microparticles of a basic anion exchange resin providing a source of polycations into the formation about the well that are trapped and retained by the interstices of the formation without rendering the interstices or the formation impermeable to the flow of fluids. Thereafter, a predetermined amount of an aqueous solution of a scale and corrosion inhibitor is injected into the formation about the well that upon contact with the basic anion exchange resin becomes fixed in a slightly soluble state either by complexation with the polycations or is precipitated by the polycations. As formation fluids are produced from the well, the scale and corrosion inhibitor is released slowly at effective concentration to inhibit scale formation and corrosion. Suitable scale and corrosion inhibitors include organic polycarboxylic acids, modified polyacrylic acids, homopolymers or copolymers where one component is an alpha, beta-ethylenically unsaturated acid monomer and the other component is an alpha, beta-ethylenically unsaturated monomer with a nonpolar, polar or ionic functional group, phosphates, phosphate esters and organic polyphosphonates. In another embodiment the basic anion exchange resin providing a source of polycations and the scale and corrosion inhibitor may be preblended prior to injection into the formation about the well.

DESCRIPTION OF THE PREFERRED EMBODIMENT

In accordance with the present invention, a subterranean formation is penetrated by a wellbore, including a casing in fluid communication therewith by means of well casing perforations in the zone of the formation. Production occurs from the formation by the flow of fluids including oil, gas and water through the perforations into the well bore with the fluids then being recovered. The production of fluids from the well can be inhibited by the formation of scale which plugs or partially plugs perforations in the casing of the wellbore, tubing inside the casing, downhole equipment such as pumps and safety valves or the formation near the well.

The present invention inhibits the formation of scale and corrosion by injecting microparticles of a basic anion exchange resin containing a polycation source into the formation near the well followed by injection of a scale and corrosion inhibitor that upon contact with the basic anion exchange resin forms a slightly soluble or tightly bonded complex with the polycations or is precipitated by the polycations and is slowly released from the formation with the produced aqueous fluids as the well is produced to inhibit scale formation and corrosion.

In the first step of our process, a predetermined amount of microparticles of a basic anion exchange resin (either weakly, moderately basic or strongly basic forms) providing a source of polycations is injected into the formation through the well whereby the microparticles of basic anion exchange resin are trapped and retained by the interstices within the formation in the vicinity of and surrounding the well. The size range of the microparticles is dependent on the average pore size, pore size distribution and the medium pore entry radii. In order to allow unobstructed entry, the microparticles are preferably equal to or below ⅓ the median pore entry radii. For instance, for a low permeability sandstone with a mean pore entry radii of 2 microns, the microparticles are preferably below 0.67 microns; whereas for a high permeability sandstone with a mean pore entry radii of 15 microns, microparticles as large as 5 microns can be utilized. The microparticles should ideally be sufficiently small to enter the pore mouths and formation fractures and be lodged or retained in the small void volumes or interstices which will not affect the production rate of fluids. Likewise, the microparticles should not be too fine as to be transported too far away from the well bore by subsequent squeezes of chemicals or water. These small particle sizes can be obtained by either finely grinding and separating existing large size commercial ion exchange resins or utilizing in situ prepared micro-sized ion exchange resins in an aqueous suspension sold under the tradename "Biocryl BPA-2100" by Rohm and Haas Company, U.S.A.

Suitable basic anion exchange resins include all anion exchange materials whether inorganic or organic in composition with the desired cations in its network. The amount of anion exchange resin injected is that which corresponds to 0.1 to 5 equivalents of anion exchange capacity per mole of scale or corrosion inhibitor to be applied subsequently or together. Preferably, this ratio is in the 0.5 to 2 range. The normal exchange capacity of anion exchange resins available is between 3 to 5 milliequivalents per gram of dry resin. The basic anion exchange resin is injected in the form of an aqueous suspension or an aqueous colloidal dispersion which optionally contains some surface active agents or polyelectrolytes to stabilize the suspension. Trapping the microparticles of the basic anion exchange resin in the formation does not decrease the permeability of the formation to the extent that there is an adverse effect in the production rate of fluids including oil and water, because the injected microparticles are in a size range at which the permeable zones of the formation are not plugged.

Once the polycation-laden microparticles are trapped in the interstices of the formation near the well, a predetermined amount of an aqueous solution of a scale and corrosion inhibitor in injected into the formation via the well that upon contact with the trapped microparticles of basic anion exchange resin becomes fixed in a slightly soluble state either by complexation with the polycations or is precipitated by the polycations. Thus, residual scale and corrosion inhibitor is retained in the formation and slowly released for the formation with the produced aqueous fluids as the well is produced thereby inhibiting formation of scale deposits in the formation in the vicinity of the wellbore, casing perforations, tubing and other downhole equipment as well as corrosion in the well. Generally, injection of the particles of basic anion exchange resin and subsequent injection of the aqueous solution of scale and corrosion inhibitor is designed to extend at least several inches, 3 or 4, to several feet, 3 or 4, or more, from the wellbore. In general, an amount of scale and/or corrosion inhibitor solution is injected into the formation surrounding the oil well that is sufficient to feed back a concentration of the inhibitor effective to prevent the formation of scale or corrosion deposits. Typically, the effective concentration is in the range of 0.05 to 50 ppm and preferably 0.5 to 10 ppm is in the produced water. The exact quantity of inhibitor solution used for a treatment is dependent on a number of factors unique to the well that is being treated. These factors include: the degree of supersaturation expected of the scale forming minerals in the produced water, the rate of production of water, temperature and pressure profile in the well, the length of protection desired which is related to the radial distance reached by the inhibitor treatment, and others. The inhibitor concentration employed can vary from 0.25% to 15% by weight in fresh water, sea water or other available brines, but preferably in the 0.5 to 5% by weight range.

Suitable scale and/or corrosion inhibitors are any chemical which can reduce or eliminate the mineral scale formation and deposition. These include both synthetic and naturally-occuring materials, chemicals which require threshold to stoichiometric (sequestration levels) quantities to inhibit. Threshold chemicals are those which are effective at concentrations below the level required to sequester; thereby, needing only 1/1000 to 1/10 the concentration of scaling mineral. The use of threshold chemicals and inhibitors is preferred. Mixtures of inhibitors or formulated inhibitors can also be employed. The inhibitors can be introduced as the free acid, partially neutralized salt or fully neutralized salt. The following list provides some example but is by no means inclusive: (1) homopolymers or copolymers (composed of two or more co-monomers) containing as one of its components, an alpha, beta-ethylenically unsaturated acid monomer such as acrylic acid, maleic anhydride, monoesters of diacid monomer and the other component in the copolymer can be any alpha, beta-ethylenically unsaturated monomer with either a non-polar, polar or ionic functional group; (2) all of the polymers cited in (1) which have been modified in some manner such as a phosphino-polyacrylic acid, sold under the tradename "Belsperse 161" or "Belasol S-29" by Ciba Geigy; (3) organic phosphate ester salts; (4) organic phosphonic acid salts; (5) inorganic phosphates; (6) anionic surfactants of various functionalities; (7) specific agents such as ethylenediamine tetraacetic acid, nitrilotriacetic acid, hexametaphosphate, tripolyhosphates, sodium carboxymethyl cellulose, gluconic acid and citric acids; and (8) starch, gums, alginates and other polysaccarides. The selection of the preferred scale and corrosion inhibitor is highly dependent upon the characteristics of the formation, the water composition, and other environmental factors.

In another embodiment of our invention, a preblend of the basic anion exchange resin and the desired scale and corrosion inhibitor fixed in a slightly soluble state either by complexation with the polycations or precipitation by the polycations can be injected into the formation about the well.

Both embodiments of our invention may follow other treatments or steps which are usually conducted in relation with a scale prevention program including for example: acid or solvent wash, mechanical cleaning of the tubings or pumps, any pretreatment with water, surfactant, deemulsifier, wetting agents, polymers, or inhibitor, wax dissolvers, etc. These pretreatments may be used to enhance the placement of the inhibitor solution or to avoid application problems. After the inhibitor has been injected, an overflush of water or oil or gas may be used to push the inhibitor to a greater radial distance. After the scale and corrosion inhibitor has been placed into the formation production of fluids including oil and water from the well is resumed. The scale and corrosion inhibitor is released slowly at effective concentration to inhibit scale formation or corrosion. The scale and corrosion treatment of this invention may be repeated on a regular basis based on experience or when the chemical return concentration falls below minimum requirements or when other scale forming indicators indicate that additional treatment should be applied.

From the foregoing specification, one skilled in the art can readily ascertain the essential features of this invention, and without departing from the spirit thereof, can adapt it to various diverse applications. It is our intention and desire that our invention be limited only by those restrictions of limitations as are contained in the claims appended immediately hereinafter below.

We claim:

1. A method for inhibiting scale and corrosion in a well penetrating a subterranean formation for the production of fluids from the formation comprising:
   (a) injecting a predetermined amount of microparticles of a basic anion exchange resin providing a source of polycations into the formation about the well that are trapped and retained by the interstices of the formation without rendering said interstices or the formation impermeable to the flow of fluids; and
   (b) injecting a predetermined amount of an aqueous solution of scale and corrosion inhibitor into the formation about the well that contacts the basic anion exchange resin providing a source of polycations and becomes fixed in a slightly soluble state either by complexation with the polycations or is precipitated by the polycations contained in said resin.

2. The method of claim 1 wherein the scale and corrosion inhibitor is an organic polycarboxylic acid, modified polyacrylic acid, homopolymers or copolymers where one component is an alpha, beta-ethylenically unsaturated acid monomer and the other component is an alpha, beta-ehthylenically unsaturated monomer with a non-polar, polar or ionic functional group, phosphates, phosphate esters and organic polyphosphonates.

3. The method of claim 1 wherein the microparticles of a basic anion exchange resin have a diameter less than ten microns.

4. The method of claim 3 wherein the basic anion exchange resin comprises a strongly basic anion exchange resin.

5. The method of claim 3 wherein the basic anion exchange resin or substance comprises a weakly basic anion exchange resin.

6. The method of claim 3 wherein the basic anion exchange resin comprises a moderately basic anion exchange resin.

7. The method of claim 1 wherein the basic anion exchange resin providing a source of polycations and the scale and corrosion inhibitor fixed in a slightly soluble state either by complexation with the polycations or precipitation by the polycations are preblended prior to injection into the formation about the well.

* * * * *

UNITED STATES PATENT AND TRADEMARK OFFICE
CERTIFICATE OF CORRECTION

PATENT NO. : 4,787,455

DATED : November 29, 1988

INVENTOR(S) : Earl S. Snavely, Jr. and John Hen

It is certified that error appears in the above-identified patent and that said Letters Patent is hereby corrected as shown below:

Column 3, line 46, change "medium" to --median--.
Column 4, line 29, change "for" to --from--.
Column 4, line 45, before "in" delete --is--.
Column 5, line 7, "change "monoesteres" to --monoesters--.
Column 5, line 19, change "tripolyhosphates" to --tripolyphosphates--.
Column 5, line 43, after "distance." begin a new paragraph.

Signed and Sealed this

Eleventh Day of July, 1989

Attest:

DONALD J. QUIGG

*Attesting Officer*    *Commissioner of Patents and Trademarks*